United States Patent [19]

Johan et al.

[11] Patent Number: 5,232,274
[45] Date of Patent: Aug. 3, 1993

[54] HAMPER FOR DISPOSABLE WASTE BAG

[76] Inventors: Tom Johan, 9921 Carmel Mountain Rd., #116, San Diego, Calif. 92129; Robert Johan, 4644 Blue Jay St., Orange, Calif. 92669

[21] Appl. No.: 976,568

[22] Filed: Nov. 16, 1992

Related U.S. Application Data

[63] Continuation-in-part of Ser. No. 684,998, Apr. 15, 1991, abandoned.

[51] Int. Cl.⁵ .............................................. B65B 67/04
[52] U.S. Cl. ........................................ 312/6; 248/98; 248/101
[58] Field of Search ............... 248/97, 98, 99, 101; 312/250, 5, 6

[56] References Cited

U.S. PATENT DOCUMENTS

| 3,603,542 | 9/1971 | Grille | 248/98 |
| 3,870,261 | 3/1975 | McSwain | 248/98 |
| 4,749,158 | 6/1988 | Buckley | 248/98 |

FOREIGN PATENT DOCUMENTS 0747915  6/1933  France .................................... 248/98

Primary Examiner—Kenneth J. Dorner
Assistant Examiner—Gerald A. Anderson
Attorney, Agent, or Firm—Keith D. Beecher

[57] ABSTRACT

A hamper constructed to have an upper rim over which a disposable waste bag may be suspended in an open condition, and a hinged frame which serves to clamp the upper end of the bag to the rim. The bag may then be conveniently loaded. A hinged lid is also provided for closing the hamper when not in use. The rim is supported on upright posts which, in turn, are mounted on a base supported on casters. A removable plastic tray may be mounted on the base to catch spillage. The lid and frame may be removable for cleaning purposes. The lid and frame are hinged to a rear portion of the upper rim by means of an elongated hinge, and the hinge has at least one resilient clip for removably attaching the hinge to the rear portion of the rim to permit the frame and lid to be removed from the bracket.

3 Claims, 4 Drawing Sheets

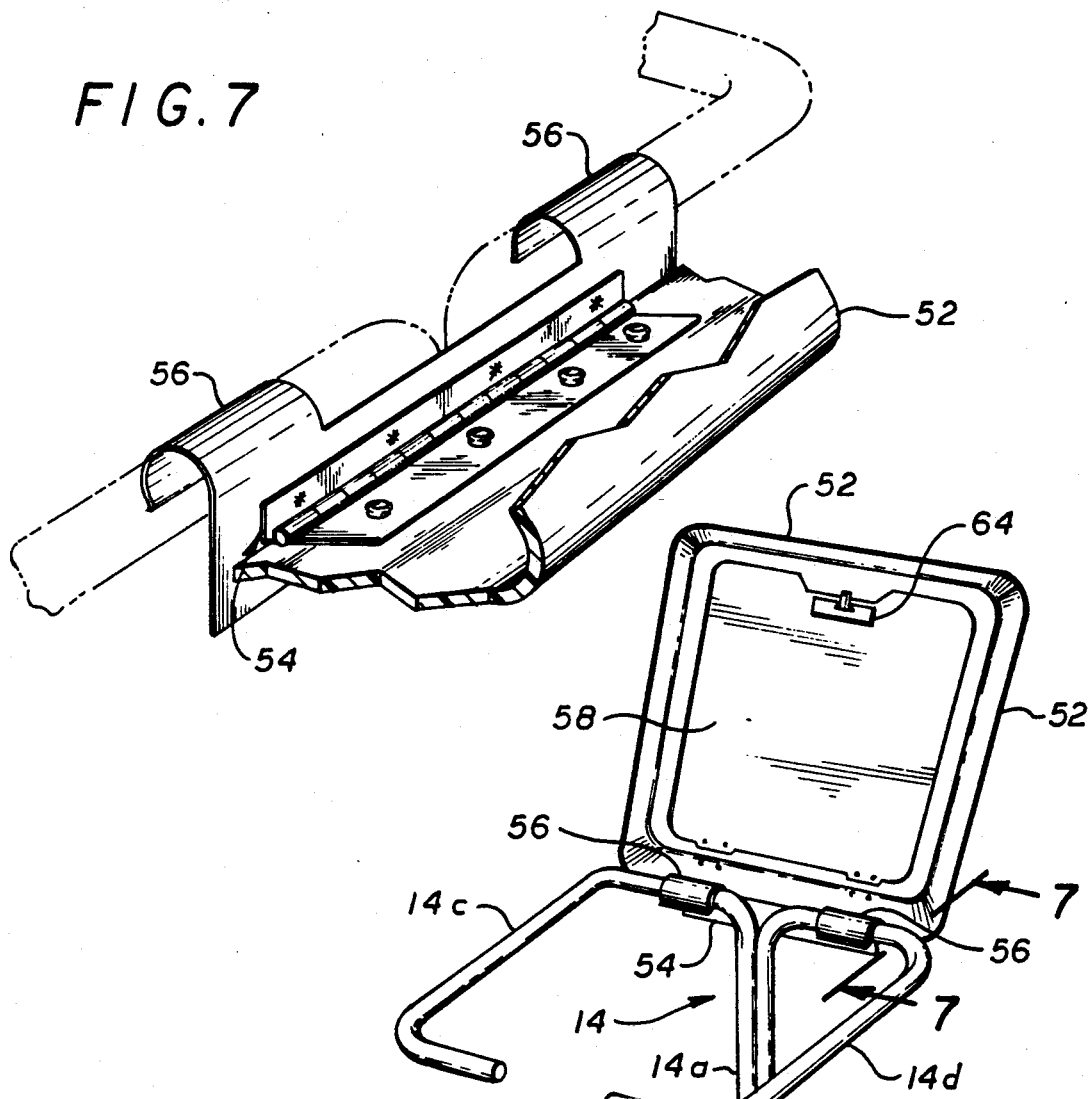
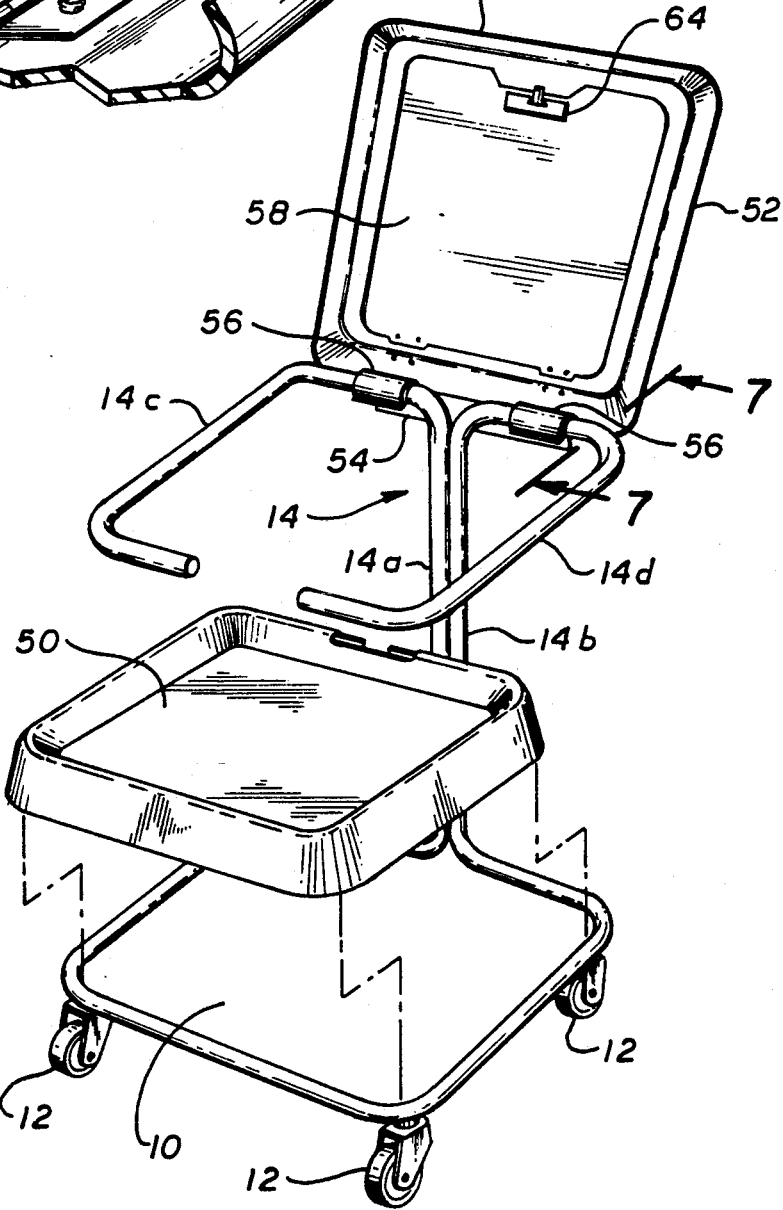

HAMPER FOR DISPOSABLE WASTE BAG

This application is a continuation-in-part of co-pending application Ser. No 07/684,998, filed Apr. 15, 1991, now abandoned.

BACKGROUND OF THE INVENTION

The invention provides an improved hamper which is supported on casters, and which finds particular utility in hospitals for removably supporting plastic bags for the disposal of medical waste products.

SUMMARY OF THE INVENTION

The hamper of the invention is constructed to have a frame which defines an upper rim over which a disposable plastic bag may be suspended with its top in a open position for receiving medical waste. The hamper also includes a hinged frame which serves to clamp he upper end of the bag to the rim. The bag may then be conveniently loaded with medical waste through its open top. A hinged lid is also provided for closing the hamper when not in use. The upper rim is supported on upright posts which are mounted on a base, which, in turn, is mounted on casters. The upper rim is discontinuous to define an opening through which the bag may be removed when the hinged frame is turned upwardly to release then bag. The frame is hinged to the upper rim by means of a hinge having an elongated configuration, and the hinge includes at least one resilient clip for removably attaching the hinge to the rear portion of the rim to permit the frame and lid to be removed from the bracket.

BRIEF DESCRIPTION OF THE DRAWINGS

FIG. 6 is a perspective, partially detached view of the second embodiment; and

FIG. 7 is a sectional view, taken along the line 7—7 of FIG. 6.

DETAILED DESCRIPTION OF THE ILLUSTRATED EMBODIMENT

Figure 1:
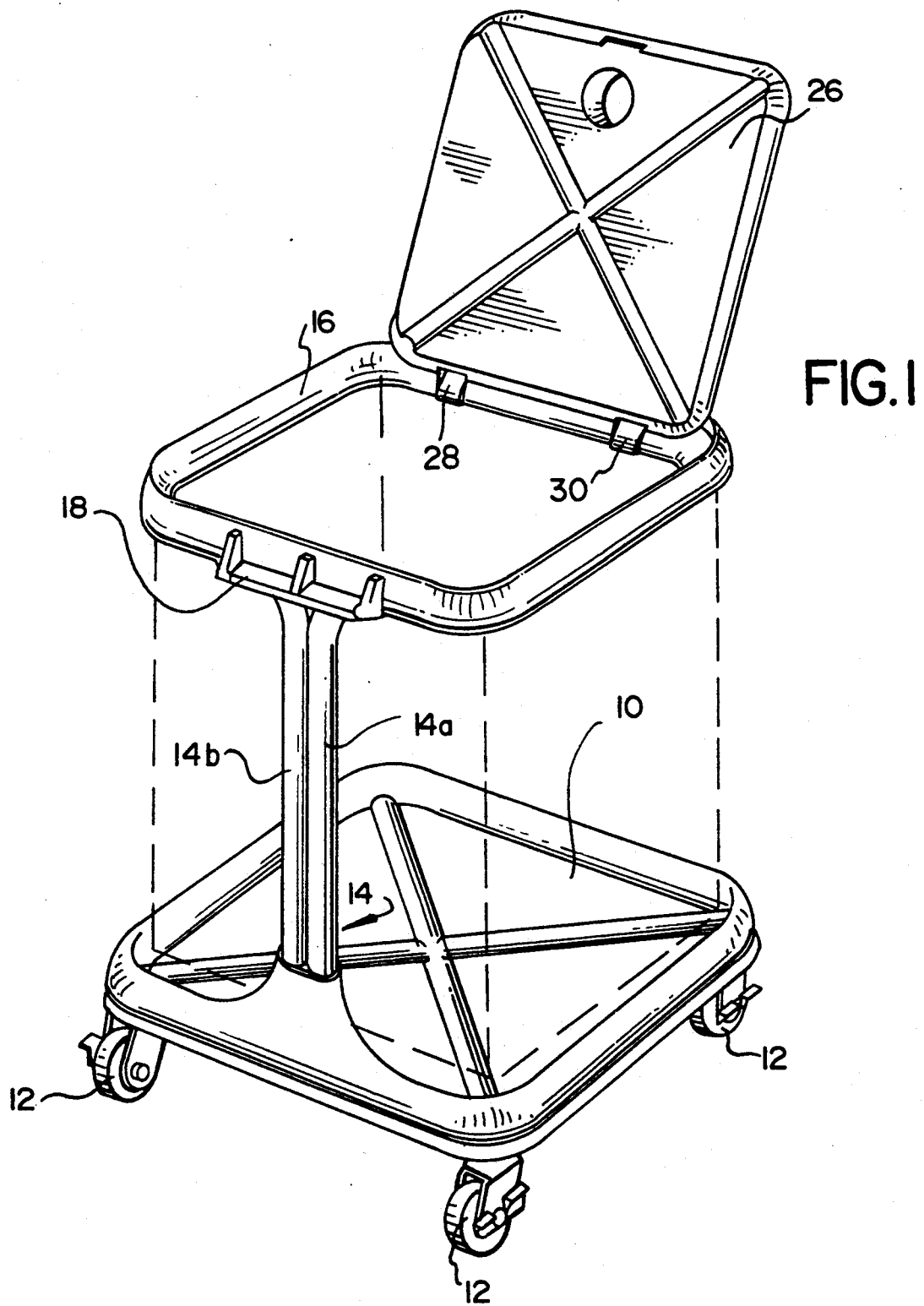
FIG. 1 is a perspective view showing the hamper of the invention in one of its embodiments, taken from the front and from one side.
Figure 2:
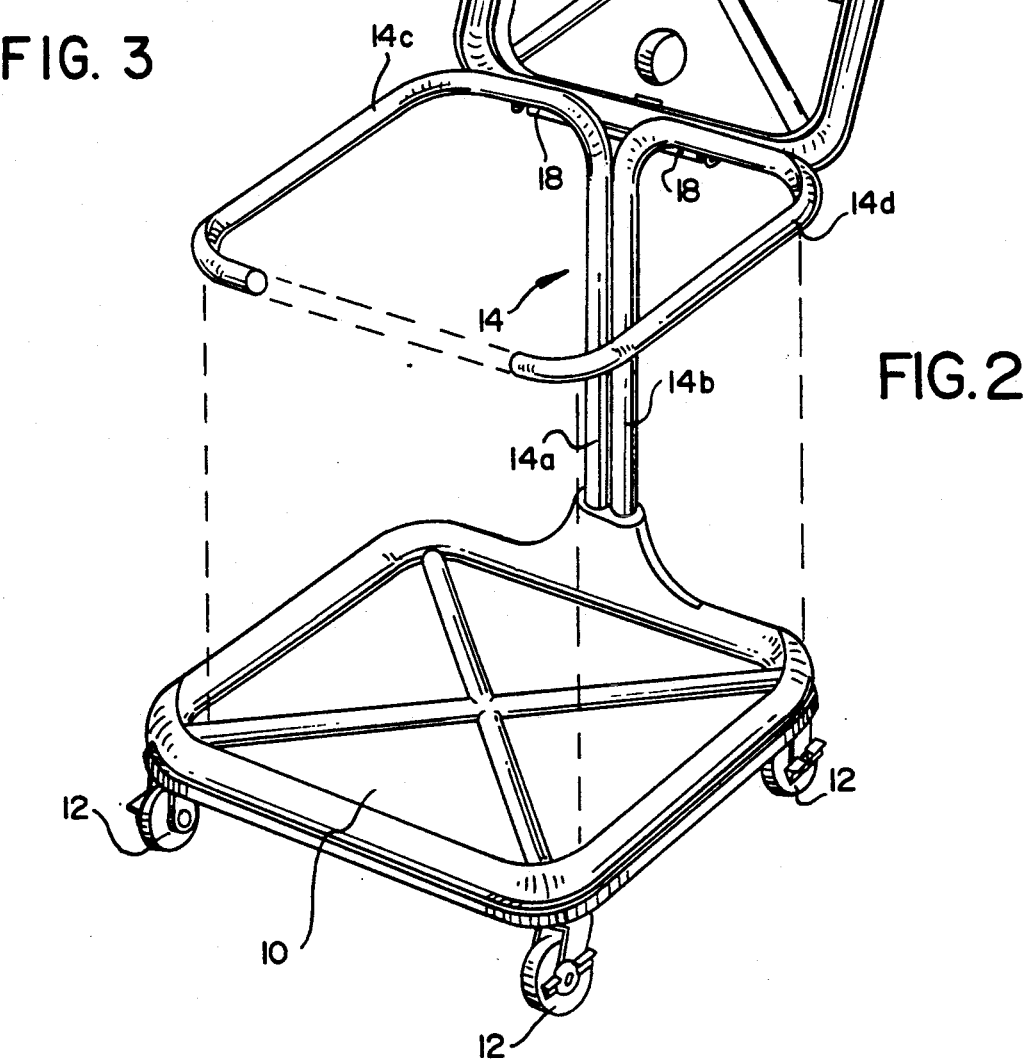
FIG. 2 is a perspective view of the hamper of FIG. 1 taken from the rear and one side.

The hamper shown in FIGS. 1 and 2 includes a rectangular base 10 which is supported on casters 12, the casters being swivably mounted on the four corners the base. At least some of the casters may be of the locking type, if so desired. A wire-formed frame 14, or bracket is mounted on the base 10, the frame defining a pair of upright posts 14a, 14b extending upwardly from the rear end of the base, and a discontinuous upper rim disposed in a plane spaced upwardly from the base and extending parallel to the base, to form a pair of upper spaced and parallel arms, or side members 14c and 14d.

The upper side members 14c and 14d, as shown in FIG. 2, and which are formed from the discontinuous upper rim, have an opening at the forward end of the hamper to permit a waste bag 40 (FIG. 3) to be inserted and removed. A rectangular frame 16 is hinged to the upper rim of frame 14 by a hinge 18.

As best shown in FIG. 2, the hinge 18 is constructed so that when the frame 16 is turned up and away from the upper rim formed by side members 14c, 14d of frame 14, the frame 16 is displaced up from the upper rim of frame 14 to permit the bag to be suspended from the upper rim without interference from the frame 16. After the bag 40 has been suspended, the frame 16 may then be clamped down over the upper rim of frame 14, as shown in FIG. 1.

The hamper also includes a rectangular lid 26 is hinged to the frame 16 by hinges 28 and 30. Hinges 28 and 30 may be positioned on the opposite side of the frame 6 from hinge 18, as shown, so that the lid may be opened and closed without any tendency to turn the frame 16 on its hinge 18. Alternatively, hinges 28 and 30 may be positioned on the same side of frame 16 as hinge 18, as in the structure of FIG. 3.

Figure 3:
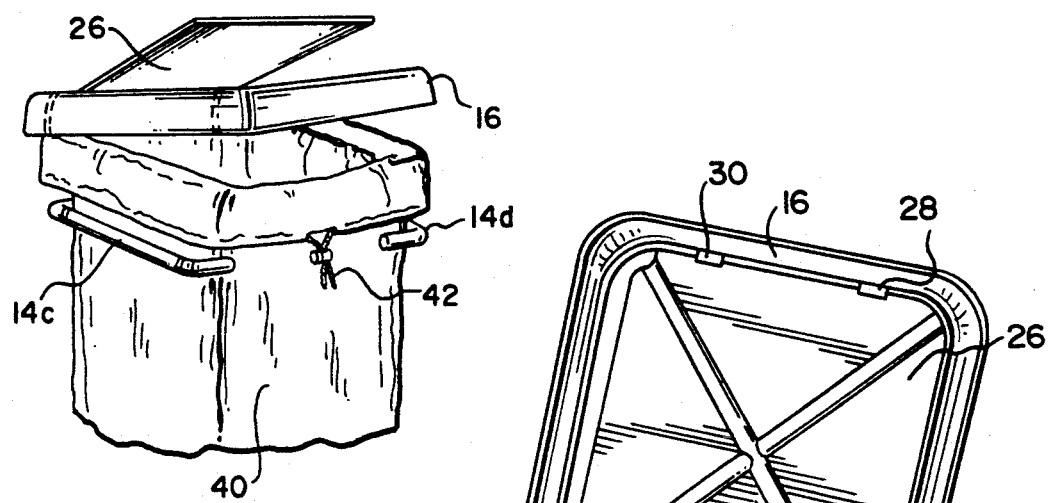
FIG. 3 is a fragmentary perspective fragmentary representation of a disposable waste bag supported in a hamper similar to the hamper of FIGS. 1 and 2.

To insert the disposable waste bag 40 into the hamper, the lid 26 and frame 16 are turned up to the position shown in FIG. 2. The bag is then inserted into the hamper through the opening in the front of the upper rim formed by the upper side members 14c and 14d. The upper edge of the bag is then folded down over the upper rim as shown in FIG. 3, and held in place by a drawstring 42. The frame 16 is then turned down over the upper edge of the bag clamping the bag in place. Medical waste may then be inserted into the bag through the open top. When the hamper is not in use, lid 26 is turned down to enclose the top of the hamper.

The hamper may be easily moved from position to position on its casters 12. When the disposable bag is full, it may be removed by turning the lid 26 and frame 16 up to the position shown in FIG. 2. Then, the bag may be released and removed through the open front of the upper rim formed by side members 14c, 14d.

The embodiment of the invention shown in FIGS. 4–7 is generally similar to the embodiment of FIGS. 1 and 2, and like components have been designated by the same numbers.

The embodiment of FIGS. 4–7 includes a removable plastic tray 50 which is mounted on base 10 in a frictional engagement. Tray 50 may be formed of ABS plastic with a modified acrylic surface to be resistant to blood stains. Tray 50 is removable for cleaning purposes.

Figure 4:
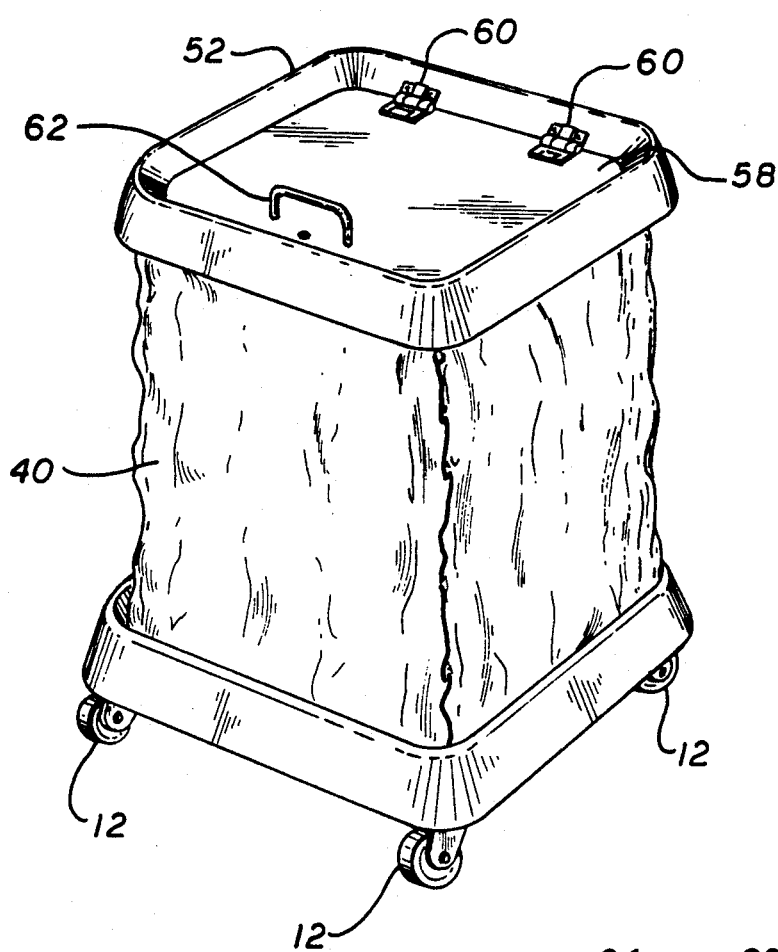
FIG. 4 is a perspective view of a second embodiment supporting a disposable waste bag and with its cover closed.
Figure 5:
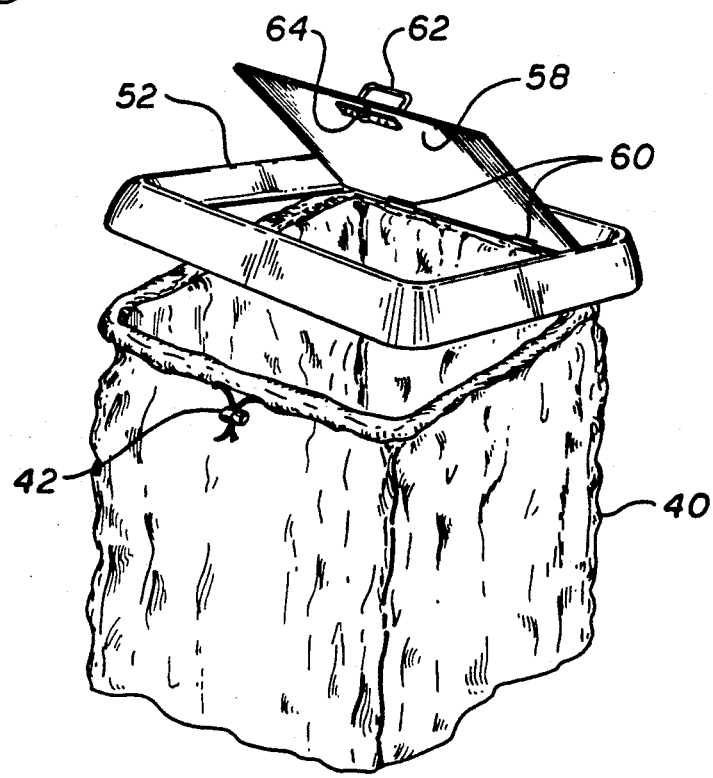
FIG. 5 is a perspective view of the second embodiment, like FIG. 4, but with the cover open.

In the embodiment of FIGS. 4–7, a rectangular frame 52 is hinged to the upper rim of frame 14 by a removable hinge 54. Hinge 54, as best shown in FIG. 7 is clipped to the upper rim of frame 14 by resilient clips 56. A rectangular lid 58 is hinged to frame 52 by hinges 60 (FIG. 4). A handle 62 is provided for the lid. The lid also has a latch 64. Hinge 54 may be unclipped from frame 14 to permit the lid and frame to be removed for cleaning purposes. Hinge 54 also acts as a stop when the frame is turned up.

The invention provides, therefore, a rigid and sturdy hamper for supporting disposable bags, particularly for medical waste. However, the hamper is not limited to such a use. The hamper is rigid and sturdy in its construction, and it is simple and relatively inexpensive to manufacture. In addition, the hamper is easy to use, in that the disposable bags may be easily inserted into and removed from the hamper.

Frame 14 may be formed of hot rolled steel. Hinge 54 may be formed of stainless steel.

It will be appreciated that while particular embodiments of the invention have been shown and described, modifications may be made. It is intended in the claims to cover all modifications which come within the true spirit and scope of the invention.

I claim:

1. A hamper assembly for supporting waste bags, and the like, comprising: a base; a bracket mounted on said base defining a pair of upright posts adjacent to one another and extending upwardly from the rear end of said base, and further defining a discontinuous rim at the upper ends of said posts disposed in an upper plane which is spaced and parallel to the plane of said base, said rim having side portions providing a pair of spaced and parallel arms adapted to receive the upper end of an open-topped waste bag with the upper edge of the bag folded over the arms, and said rim defining an open space in the front of the hamper to permit the bag to be inserted onto and removed from the rim, and said rim having a rear portion; a frame member hinged to the rear portion of said rim and turnable from an open position in which said frame member is displaced up from the rim to a closed position in which said frame member serves to clamp the upper edge of the waste bag to the rim; and a lid hinged to said frame member, and which includes a hinge coupling said frame to said rear portion of said rim, said hinge having an elongated configuration and including at least one resilient clip for removably attaching said hinge to said rear portion of said rim to permit said frame and said lid to be removed from said bracket.

2. The hamper assembly defined in claim 1 in which said hinge is configured to act as a stop when the frame is turned to an up position.

3. A hamper assembly for supporting open-topped waste bags, and the like, comprising: a base; a bracket mounted on said base defining a pair of upright posts adjacent to one another and extending upwardly from the rear end of said base, and further defining a discontinuous rim at the upper ends of said posts disposed in an upper plane which is spaced and parallel to the plane of said base, said rim having side portions providing a pair of spaced and parallel arms adapted to receive the upper end of a open-topped waste bag with the upper edge of the bag folded over the arms, and said rim defining an open space of the front of the hamper to permit the bag to be inserted into and removed from the rim, and said rim having a rear portion; an upper member hinged to the rear portion of said rim and turnable from an open position in which said upper member is displaced up from the rim to a closed position in which said upper member serves to clamp the upper edge of the waste bag to the rim, and which includes a hinge coupling said upper member to said rear portion of said rim, said hinge having an elongated configuration and including at least one resilient clip from removably attaching said hinge to said rear portion of said rim to permit said upper member to be removed from said bracket.

* * * * *